Aug. 18, 1942.　　　H. A. GROOTHEDDE　　　2,293,336
TREE STRAIGHTENER
Filed Nov. 4, 1941

INVENTOR
Harry A. Groothedde.
BY M. Hoyt Young
ATTORNEY

Patented Aug. 18, 1942

2,293,336

UNITED STATES PATENT OFFICE 2,293,336

TREE STRAIGHTENER

Harry A. Groothedde, Haledon, N. J.

Application November 4, 1941, Serial No. 417,757

1 Claim. (Cl. 47—42)

The proposed invention is a device for straightening trees. Most professional nurserymen as well as amateurs spend considerable time correcting the shape and form of their trees. This correction period may cover several months for a complete reformation. A single tree may require several corrections starting from the seedling stage until it is several years old. From a business standpoint this operation pays since straight, uniform trees are three or four times as valuable as crooked ones.

The usual method employed for straightening a tree is to provide splints which are lashed by means of ties to the particular section of the tree to be straightened. By providing the splint of a more rigid material than the tree section the tree may be pulled tightly against the splint into a straightened position and then tied firmly to the splint. Skill is required to make the ties tight otherwise the tree will not be transformed to the straight line of the splint.

In order to overcome the difficulties of lashing a splint to the tree and save the nurserymen considerable time, I propose using a device of the type disclosed in this application. It can ordinarily be mounted on a tree in five or ten seconds. If the ties of a splint are not made tight enough they must be removed and the tying operation repeated. With the proposed tree straighteners the device may be removed or adjusted to a new position in a few seconds since there is no fixed attachment or fastening employed.

Additional purposes and advantages of the proposed device will be pointed out in the detailed description below when read in conjunction with the drawing in which—

Figure 1:
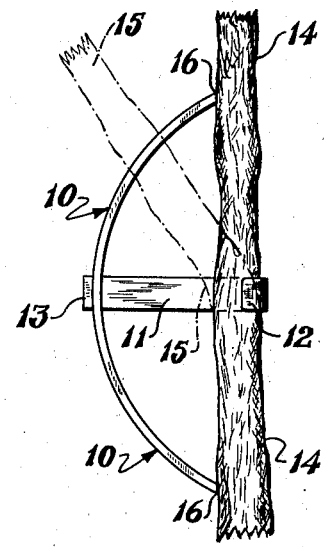
Fig. 1 is a side elevational view showing my invention in its basic form mounted on a tree in the process of being straightened.

The basic features of the device comprise a frame 10 adapted to press against a tree 14 at two separated points along its trunk. Approximately midway of these points an arm 11 is fastened to said frame 10 at point 13 and is provided with a hook 12. The hook 12 is adapted to hook around the trunk or branch 14 which is to be straightened. Notched end portions 16 are provided at the points where the frame 10 rests against the tree 14.

The procedure for straightening the bent tree trunk 15 (shown in dotted lines Fig. 1) is as follows: The trunk is bent by hand in the reverse curve from its natural bend and then temporarily held in this position while the device is being mounted on the tree at the proper point. When the frame 10 has been correctly mounted, the tree trunk, which has been held in a reverse bend as related above, is released. The tree will then tend to spring back and would return to its original form except for the tree straightener retaining it in a straight line between the frame ends 16 and the central hook 12. The device is allowed to remain in this position for a period of time or until such times as the tree will remain straight after removing the straightener.

One of the advantages of using the proposed invention is that it may be readily removed from a tree in order to determine whether or not the correction is complete or not. If the bend still exists the device may be remounted on the tree again and allowed to remain until the proper result is obtained. To accomplish the same thing with tied splints would take considerably more time than when employing the proposed device.

By providing the frame 10 of a resilient material such as spring steel, one size of straightener can be employed for serving a fairly wide range of tree diameters. However it is anticipated that a series of various sizes will be furnished whereby the user may select the proper size for the particular diameter of trunk or branch to be straightened.

Figure 4:
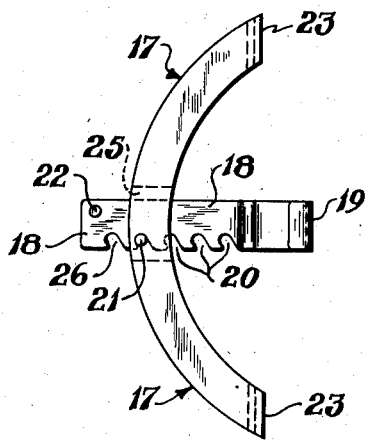
Fig. 4 is a side elevational view showing another form of the device as provided with an adjustable means for clamping the device to the tree and applying any desired tension required.
Figure 5:
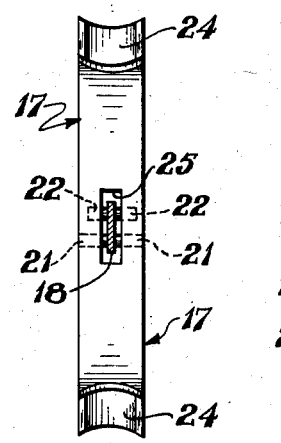
Fig. 5 is a front elevation.
Figure 6:
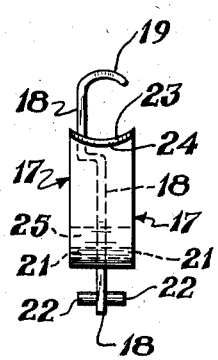
Fig. 6 is a top plan view of the same.

The simple form of straightener illustrated in the first three figures gives best results on smaller trees or branches but on heavier sections or where the reverse bend is to be applied gradually its limitations must be considered. To apply the principle of the device to heavier branches or trunks wherein a gradual return to its normal straight position may be accomplished, the improved form of straightener illustrated in Figs. 4, 5, and 6 has been provided. The frame 17 is of a heavier construction having little if any resilience. The ends 23 of the frame 17 which press against the tree at separated points are notched or shaped so as to give a more perfect fit against the tree. A soft pad 24 may be provided in the recess 23 to prevent the tree from injury.

The arm 18 is provided with the hook 19 and is adjustable with relation to the frame ends 23. Said arm 18 is held in the rectangular guide slot 25 of frame 17. The arm 18 is provided with a series of notches 20 in the form of a rack. A pin 21 is provided in the frame 17 and passes across the lower portion of the slot 25 wherein it is adapted to enter the notches 20 of arm 18 and retain said arm in its adjusted position. A pin 22 is also provided in arm 18 to act as a stop and prevent said arm from falling out of the slot 25.

Figure 2:
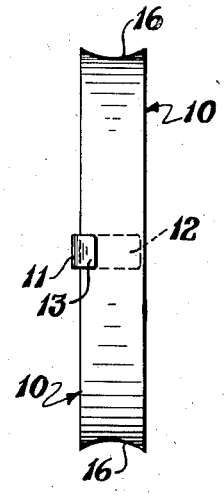
Fig. 2 is a front elevation and Fig. 3 is a top plan view of the same.
Figure 3:
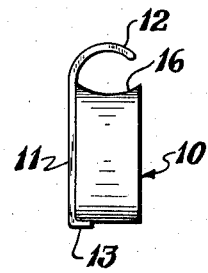

In operation the arm 18 would be moved until the pin 21 was located in the last notch 26 of the series. The trunk or branch to be straightened is then bent in a reverse direction and the straightening device correctly mounted on the tree, similar to the method described above in reference to the simpler basic structure (Figs. 1, 2, and 3). After setting the device as related above, if the trunk or branch is not straight then the hook 19 must be forced further in until it is approximately in line with the frame ends 23. Therefore by holding the frame 17 in one hand and pressing the hook 19 inward (to the left in Fig. 4) until the desired position is reached the notches 20 of arm 18 will drop over pin 21 and retain the arm from being pulled out due to the tension of the bent tree trunk or branch.

In the same way the trunk or branch may be straightened gradually in place of all at one setting. This can readily be accomplished by merely forcing the arm 18 backward into the opening or guide slot 25, one notch at a time; that is, the arm 18 is pushed backward thereby causing a more decided bend in the trunk or branch so that the pin 21 enters the series of notches 20 progressively until the full set or bend in the tree has been attained. When this has been done the straightening device is allowed to stay in that position for a long period of time or at least until such time as the tree will retain its proper shape after the device has been removed. On the other hand the arm 18 may be pushed backward one notch and the device allowed to remain in that position for a shorter period of straightening. After that it is pushed backward another notch and so on, the process is repeated for the purpose of gradually correcting the tree without forcing the entire corrective bend on it at the one setting.

I claim:

A device of the type described comprising a frame adapted to press against a tree at two points, grooves in said frame at said points for maintaining the frame and tree in proper relative position, pads in said grooves for preventing injury to the tree, a slot in said frame, a pin in said frame extending across said slot, an arm adapted to ride in said slot and extend therethrough, notches in said arm adapted to engage with said pin for retaining the arm in its adjusted position in relation to the frame, a stop provided at one end of said arm for preventing the arm from being withdrawn from the slot, and a hook at the other end of said arm adapted to be forced against the tree approximately midway of the two points of contact of the frame with the tree thereby providing a three point contact for setting up a corrective bend in said tree between the frame and the arm hook.

HARRY A. GROOTHEDDE.